(12) United States Patent
Ma et al.

(10) Patent No.: US 8,767,828 B2
(45) Date of Patent: Jul. 1, 2014

(54) SYSTEM FOR LOW RESOLUTION POWER REDUCTION WITH COMPRESSED IMAGE

(75) Inventors: Zhan Ma, Brooklyn, NY (US); Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 604 days.

(21) Appl. No.: 12/838,381

(22) Filed: Jul. 16, 2010

(65) Prior Publication Data

US 2012/0014448 A1    Jan. 19, 2012

(51) Int. Cl.
*H04N 7/12*      (2006.01)
*H04N 11/02*     (2006.01)
*H04N 11/04*     (2006.01)
*G06K 9/46*      (2006.01)

(52) U.S. Cl.
USPC ............ 375/240.13; 375/240.29; 375/240.16; 382/245

(58) Field of Classification Search
USPC .................................... 375/240.13
See application file for complete search history.

(56) References Cited

U.S. PATENT DOCUMENTS

| 6,243,421 B1 | 6/2001 | Nakajima et al. | |
| 2003/0118243 A1 * | 6/2003 | Sezer et al. | 382/245 |
| 2004/0017853 A1 * | 1/2004 | Garrido et al. | 375/240.16 |
| 2006/0126730 A1 | 6/2006 | Arakawa et al. | |
| 2006/0146941 A1 * | 7/2006 | Cha et al. | 375/240.29 |
| 2006/0222066 A1 | 10/2006 | Yoo et al. | |
| 2007/0195882 A1 | 8/2007 | Tichelaar et al. | |
| 2008/0056363 A1 | 3/2008 | Lyashevsky et al. | |
| 2008/0240253 A1 | 10/2008 | Au et al. | |
| 2008/0240254 A1 | 10/2008 | Au et al. | |

FOREIGN PATENT DOCUMENTS

| EP | 2056606 A1 | 5/2009 |
| JP | 11-146399 A | 5/1999 |
| JP | 2007-221697 A | 8/2007 |
| WO | 2008012918 A1 | 1/2008 |

OTHER PUBLICATIONS

International Search Report, mailed Oct. 25, 2011, Japanese International Patent App. No. PCT/JP2011/066636, filed Jul. 14, 2011, Sharp Kabushiki Kaisha, 10 pgs.

Ma et al., "System for Graceful Power Degradation," Joint Collaborative Team on Video Coding (JCT-VC) of ITU-T SG16 WP3 and ISO/IEC JTC1/SC29/WG11, JCTVC-B114, 2nd Meeting: Geneva, CH, Jul. 2010, 7 pgs.

* cited by examiner

*Primary Examiner* — Hee-Yong Kim
(74) *Attorney, Agent, or Firm* — Chernoff Vilhauer McClung & Stenzel, LLP

(57) ABSTRACT

A system for encoding and decoding video that uses power reduction techniques.

9 Claims, 7 Drawing Sheets

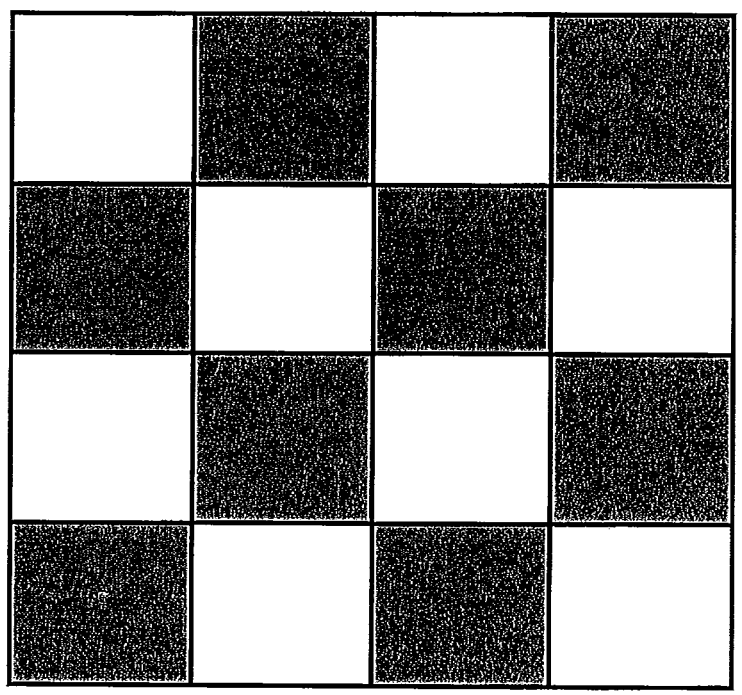
FIG. 4 SAMPLING STRUCTURE OF THE FRAME BUFFER COMPRESSION ALGORITHM

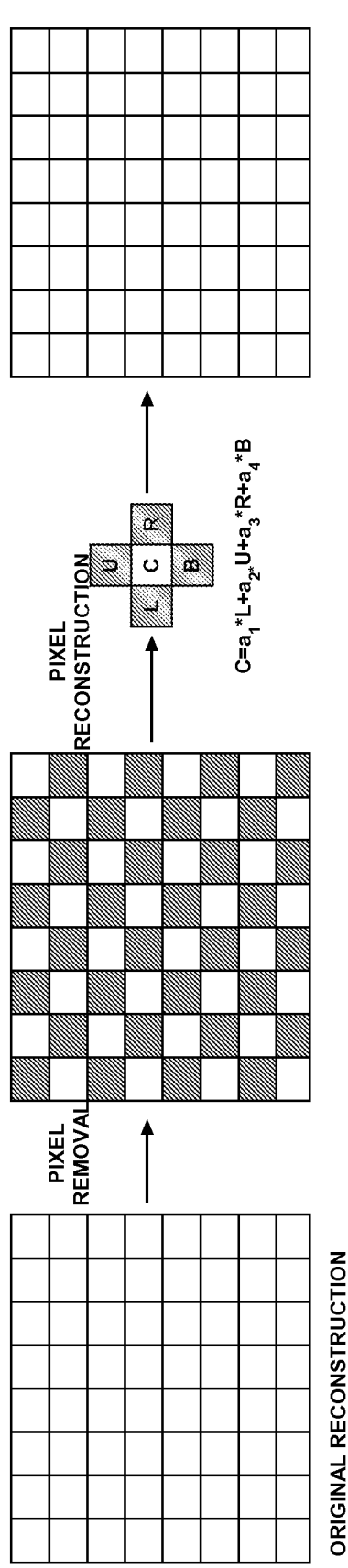
FIG. 5 - BLOCK DIAGRAM OF THE INTEGRATION OF THE FRAME BUFFER COMPRESSION ALGORITHM IN THE VIDEO CODEC.

| | | | | | | | | | |
|---|---|---|---|---|---|---|---|---|---|
| | $p3_0$ | $p2_0$ | $p1_0$ | $p0_0$ | $q0_0$ | $q1_0$ | $q2_0$ | $q3_0$ | |
| | $p3_1$ | $p2_1$ | $p1_1$ | $p0_1$ | $q0_1$ | $q1_1$ | $q2_1$ | $q3_1$ | |
| | $p3_2$ | $p2_2$ | $p1_2$ | $p0_2$ | $q0_2$ | $q1_2$ | $q2_2$ | $q3_2$ | |
| | $p3_3$ | $p2_3$ | $p1_3$ | $p0_3$ | $q0_3$ | $q1_3$ | $q2_3$ | $q3_3$ | B |
| A | $p3_4$ | $p2_4$ | $p1_4$ | $p0_4$ | $q0_4$ | $q1_4$ | $q2_4$ | $q3_4$ | |
| | $p3_5$ | $p2_5$ | $p1_5$ | $p0_5$ | $q0_5$ | $q1_5$ | $q2_5$ | $q3_5$ | |
| | $p3_6$ | $p2_6$ | $p1_6$ | $p0_6$ | $q0_6$ | $q1_6$ | $q2_6$ | $q3_6$ | |
| | $p3_7$ | $p2_7$ | $p1_7$ | $p0_7$ | $q0_7$ | $q1_7$ | $q2_7$ | $q3_7$ | |

FIG. 6

SYSTEM FOR LOW RESOLUTION POWER REDUCTION WITH COMPRESSED IMAGE

CROSS-REFERENCE TO RELATED APPLICATIONS

None

BACKGROUND OF THE INVENTION

The present invention relates to a video system with power reduction.

Existing video coding standards, such as H.264/AVC, generally provide relatively high coding efficiency at the expense of increased computational complexity. The relatively high computational complexity has resulted in significant power consumption, which is especially problematic for low power devices such as cellular phones.

Power reduction is generally achieved by using two primary techniques. The first technique for power reduction is opportunistic, where a video coding system reduces its processing capability when operating on a sequence that is easy to decode. This reduction in processing capability may be achieved by frequency scaling, voltage scaling, on-chip data pre-fetching (caching), and/or a systematic idling strategy. In many cases the resulting decoder operation conforms to the standard. The second technique for power reduction is to discard frame or image data during the decoding process. This typically allows for more significant power savings but generally at the expense of visible degradation in the image quality. In addition, in many cases the resulting decoder operation does not conform to the standard.

BRIEF DESCRIPTION OF THE SEVERAL VIEWS OF THE DRAWINGS

FIG. 4 illustrates a sampling structure of the frame buffer.
FIG. 5 illustrates integration of the frame buffer in the decoder.
FIG. 6 illustrates representative pixel values of two blocks.

DETAILED DESCRIPTION OF PREFERRED EMBODIMENT

It is desirable to enable significant power savings typically associated with discarding frame data without visible degradation in the resulting image quality and standard non-conformance. Suitably implemented the system may be used with minimal impact on coding efficiency. In order to facilitate such power savings with minimal image derogation and loss of coding efficiency, the system should operate alternatively on low resolution data and high resolution data. The combination of low resolution data and high resolution data may result in full resolution data. The use of low resolution data is particularly suitable when the display has a resolution lower than the resolution of the transmitted content.

Power is a factor when designing higher resolution decoders. One major contributor to power usage is memory bandwidth. Memory bandwidth traditionally increases with higher resolutions and frame rates, and it is often a significant bottleneck and cost factor in system design. A second major contributor to power usage is high pixel counts. High pixel counts are directly determined by the resolution of the image frame and increase the amount of pixel processing and computation. The amount of power required for each pixel operation is determined by the complexity of the decoding process. Historically, the decoding complexity has increased in each "improved" video coding standard.

Figure 1:
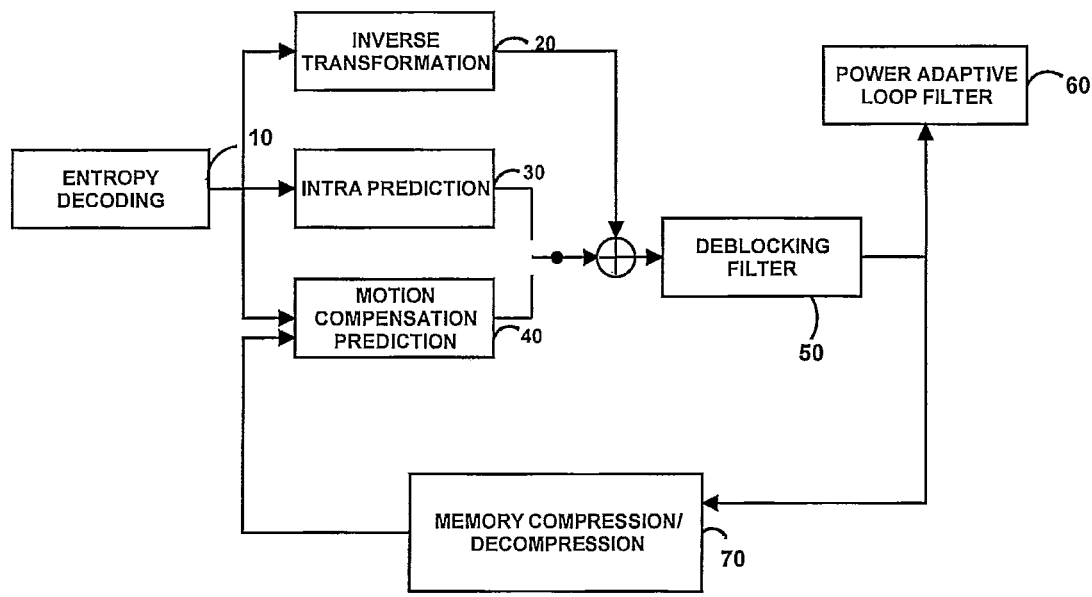
FIG. 1 illustrates a decoder.

Referring to FIG. 1, the system may include an entropy decoding module 10, a transformation module (such as inverse transformation using a dequant IDCT) 20, an intra prediction module 30, a motion compensated prediction module 40, a deblocking module 50, an adaptive loop filter module 60, and a memory compression/decompression module associated with a frame buffer 70. The arrangement and selection of the different modules for the video system may be modified, as desired. The system, in one aspect, preferably reduces the power requirements of both memory bandwidth and high pixel counts of the frame buffer. The memory bandwidth is reduced by incorporating a frame buffer compression technique within a video coder design. The purpose of the frame buffer compression technique is to reduce the memory bandwidth (and power) required to access data in the reference picture buffer. Given that the reference picture buffer is itself a compressed version of the original image data, compressing the reference frames can be achieved without significant coding loss for many applications.

To address the high pixel counts, the video codec should support a low resolution processing mode without drift. This means that the decoder may switch between low-resolution and full-resolution operating points and be compliant with the standard. This may be accomplished by performing prediction of both the low-resolution and high-resolution data using the full-resolution prediction information but only the low-resolution image data. Additionally, this may be improved using a de-blocking process that makes de-blocking decisions using only the low-resolution data. De-blocking is applied to the low-resolution data and, also if desired, the high-resolution data. The de-blocking of the low-resolution pixels does not depend on the high-resolution pixels. The low resolution deblocking and high resolution deblocking may be performed serially and/or in parallel. However, the de-blocking of the high resolution pixels may depend on the low-resolution pixels. In this manner the low resolution process is independent of the high resolution process, thus enabling a power savings mode, while the high resolution process may depend on the low resolution process, thus enabling greater image quality when desired.

Figure 2:
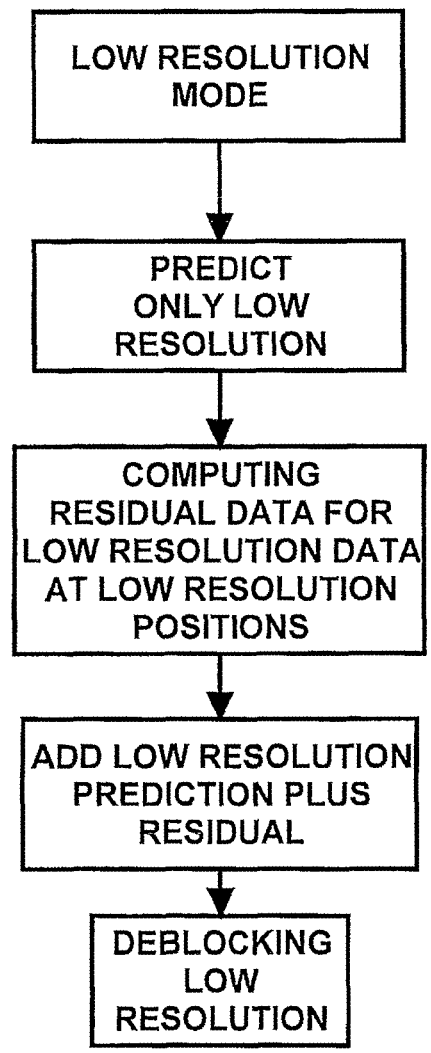
FIG. 2 illustrates low resolution prediction.

Referring to FIG. 2, when operating in the low-resolution mode, a decoder may exploit the properties of low-resolution prediction and modified de-blocking to significantly reduce the number of pixels to be processed. This may be accomplished by predicting only the low-resolution data. Then after predicting the low resolution data, computing the residual data for only the low-resolution pixels (i.e., pixel locations) and not the high resolution pixels (i.e., pixel locations). The residual data is typically transmitted in a bit-stream. The residual data computed for the low-resolution pixel values has the same pixel values as the full resolution residual data at the low-resolution pixel locations. The principal difference is that the residual data needs to only be calculated at the position of the low-resolution pixels. Following calculation of the residual, the low-resolution residual is added to the low-resolution prediction, to provide the low resolution pixel values. The resulting signal is then de-blocked. Again, the de-blocking is preferably performed at only the low-resolution sample locations to reduce power consumption. Finally, the result may be stored in the reference picture frame buffer for future prediction. Optionally, the result may be processed with an adaptive loop filter. The adaptive loop filter may be related to the adaptive loop filter for the full resolution data, or it may be signaled independently, or it may be omitted.

Figure 3A:
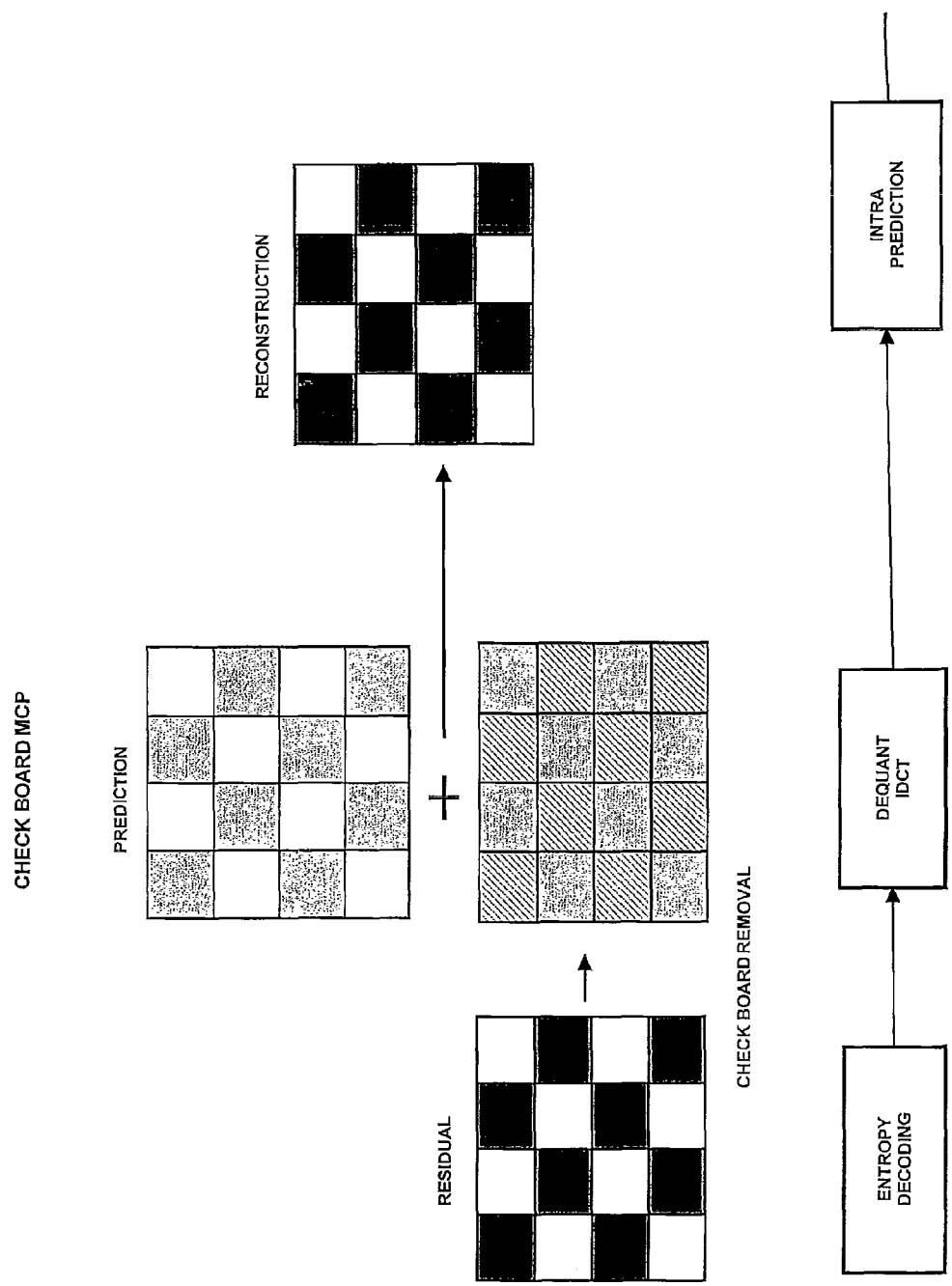
FIGS. 3A and 3B illustrate a decoder and data flow for the decoder.
Figure 3B:
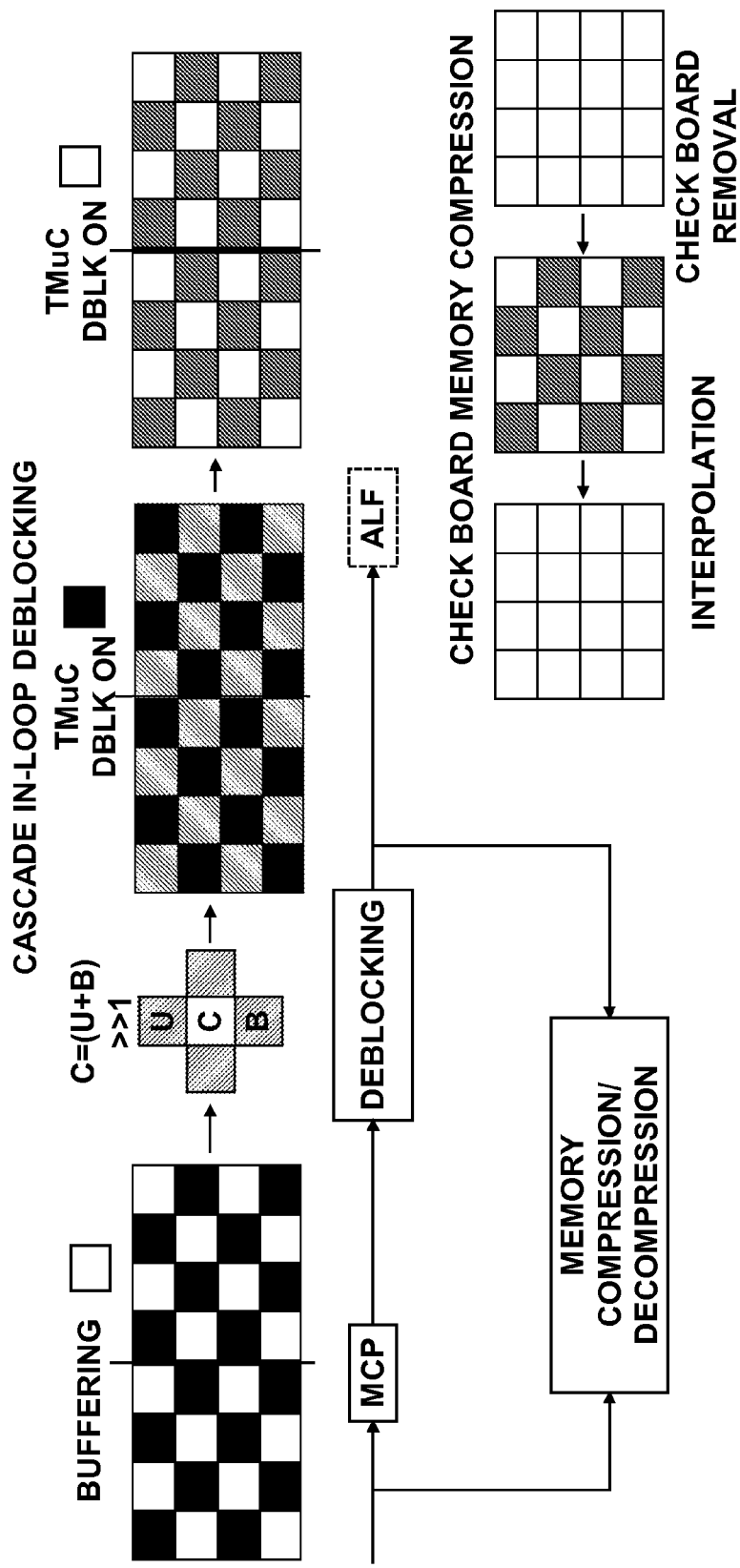

An exemplary depiction of the system operating in low-resolution mode is shown in FIGS. 3A and 3B. The system may likewise include a mode that operates in full resolution mode. As shown in FIGS. 3A and 3B, entropy decoding may be performed at full resolution, while the inverse transform (Dequant IDCT) and prediction (Intra Prediction; Motion Compensated Prediction (MCP)) are preferably performed at low resolution. The de-blocking is preferably performed in a cascade fashion so that the de-blocking of the low resolution pixels do not depend on the additional, high resolution data. Finally, a frame buffer that includes memory compression stores the low-resolution data used for future prediction.

The frame buffer compression technique is preferably a component of the low resolution functionality. The frame buffer compression technique preferably divides the image pixel data into multiple sets, and that a first set of the pixel data does not depend on other sets. In one embodiment, the system employs a checker-board pattern as shown in FIG. 4. In FIG. 4, the shaded pixel locations belong to the first set and the un-shaded pixels belong to the second set. Other sampling structures may be used, as desired. For example, every other column of pixels may be assigned to the first set. Alternatively, every other row of pixels may be assigned to the first set. Similarly, every other column and row of pixels may be assigned to the first set. Any suitable partition into multiple sets of pixels may be used.

For memory compression/decompression the frame buffer compression technique preferably has the pixels in a second set of pixels be linearly predicted from pixels in the first set of pixels. The prediction may be pre-defined. Alternatively, it may be spatially varying or determined using any other suitable technique.

In one embodiment, the pixels in the first set of pixels are coded. This coding may use any suitable technique, such as for example, block truncation coding (BTC), such as described by Healy, D.; Mitchell, O., "Digital Video Bandwidth Compression Using Block Truncation Coding," IEEE Transactions on Communications [legacy, pre-1988], vol. 29, no. 12 pp. 1809-1817, December 1981, absolute moment block truncation coding (AMBTC), such as described by Lema, M.; Mitchell, O., "Absolute Moment Block Truncation Coding and Its Application to Color Images," IEEE Transactions on Communications [legacy, pre-1988], vol. 32, no. 10 pp. 1148-1157, October 1984, or scalar quantization. Similarly, the pixels in the second set of pixels may be coded and predicted using any suitable technique, such as for example being predicted using a linear process known to the frame buffer compression encoder and frame buffer compression decoder. Then the difference between the prediction and the pixel value may be computed. Finally, the difference may be compressed. In one embodiment, the system may use block truncation coding (BTC) to compress the first set of pixels. In another embodiment, the system may use absolute moment block truncation coding (AMBTC) to compress the first set of pixels. In another embodiment, the system may use quantization to compress the first set of pixels. In yet another embodiment, the system may use bi-linear interpolation to predict the pixel values in the second set of pixels. In a further embodiment, the system may use bi-cubic interpolation to predict the pixel values in the second set of pixels. In another embodiment, the system may use bi-linear interpolation to predict the pixel values in the second set of pixels and absolute moment block truncation coding (AMBTC) to compress the residual difference between the predicted pixel values in the second set and the pixel value in the second set.

A property of the frame buffer compression technique is that it is controlled with a flag to signal low resolution processing capability. In one configuration when this flag does not signal low resolution processing capability, then the frame buffer decoder produces output frames that contain the first set of pixel values (i.e. low resolution pixel data), possibly compressed, and the second set of pixel values (i.e. high resolution pixel data) that are predicted from the first set of pixel values and refined with optional residual data. In another configuration when this flag does signal low resolution processing capability, then the frame buffer decoder produces output frames that contain the first set of pixel values, possibly compressed, and the second set of pixel values that are predicted from the first set of pixel values but not refined with optional residual data. Accordingly, the flag indicates whether or not to use the optional residual data. The residual data may represent the differences between the predicted pixel values and the actual pixel values.

For the frame buffer compression encoder, when the flag does not signal low resolution processing capability, then the encoder stores the first set of pixel values, possibly in compressed form. Then, the encoder predicts the second set of pixel values from the first set of pixel values. In some embodiments, the encoder determines the residual difference between the prediction and actual pixel value and stores the residual difference, possibly in compressed form. In some embodiments, the encoder selects from multiple prediction mechanisms a preferred prediction mechanism for the second set pixels. The encoder then stores the selected prediction mechanism in the frame buffer. In one embodiment, the multiple prediction mechanisms consist of multiple linear filters and the encoder selects the prediction mechanism by computing the predicted pixel value for each linear filter and selecting the linear filter that computes a predicted pixel value that is closest to the pixel value. In one embodiment, the multiple prediction mechanisms consist of multiple linear filters and the encoder selects the prediction mechanism by computing the predicted pixel values for each linear filter for a block of pixel locations and selecting the linear filter that computes a block of predicted pixel value that are closest to the block of pixel values. A block of pixels is a set of pixels within an image. The determination of the block of pixel predicted pixel values that are closest to the block of pixel values may be determined by selecting the block of predicted pixel values that result in the smallest sum of absolute differences between the block of predicted pixels values and block of pixels values. Alternatively, the sum of squared differences may be used to select the block. In other embodiments, the residual difference is compressed with block truncation coding (BTC). In one embodiment, the residual difference is compressed with the absolute moment block truncation coding (AMBTC). In one embodiment, the parameters used for the compression of the second set pixels are determined from the parameters used for the compression of the first set of pixels. In one embodiment, the first set of pixels and second set of pixels use AMBTC, and a first parameter used for the AMBTC method of the first set of pixels is related to a first parameter used for the AMBTC method for the second set of pixels. In one embodiment, said first parameter used for the second set of pixels is equal to said first parameter used for the first set of pixels and not stored. In another embodiment, said first parameter used for the second set of pixels is related to said first parameter used for the first set of pixels. In one embodiment, the relationship may be defined as a scale factor, and the scale factor stored in place of said first parameter used for the second set of pixels. In other embodiments, the relationship may be defined as an index into a look-up-table of scale factors, the index stored in place of said first parameter used for the second set of pixels. In other embodiments, the relationship may be pre-defined. In other embodiments, the encoder combines the selected prediction mechanism and residual difference determination step. By comparison, when the flag signals low resolution processing capability, then the encoder stores the first set of pixel values, possibly in compressed form. However, the encoder does not store residual information. In embodiments described above that determine a selected prediction mechanism, the encoder does not compute the selected prediction mechanism from the reconstructed data. Instead, any selected prediction mechanism is signaled from the encoder to the decoder.

The signaling of a flag enables low resolution decoding capability. The decoder is not required to decode a low resolution sequence even when the flag signals a low resolution decoding capability. Instead, it may decode either a full resolution or low resolution sequence. These sequences will have the same decoded pixel values for pixel locations on the low resolution grid. The sequences may or may not have the same decoded pixel values for pixel locations on the high resolution grid. The signaling the flag may be on a frame-by-frame basis, on a sequence-by-sequence basis, or any other basis.

When the flag appears in the bit-stream, the decoder preferably performs the following steps:

(a) Disables the residual calculation in the frame buffer compression technique. This includes disabling the calculation of residual data during the loading of reference frames as well as disabling the calculation of residual data during the storage of reference frames, as illustrated in FIG. 5.

(b) Uses low resolution pixel values for low resolution deblocking, as previously described. Uses an alternative deblocking operation for the sample locations in the higher resolution locations, as previously described.

(c) Stores reference frames prior to applying the adaptive loop filter.

With these changes, the decoder may continue to operate in full resolution mode. Specifically, for future frames, it can retrieve the full resolution frame from the compressed reference buffer, perform motion compensation, residual addition, de-blocking, and loop filter. The result will be a full resolution frame. This frame can still contain frequency content that occupies the entire range of the full resolution pixel grid.

Alternatively though, the decoder may choose to operate only on the low-resolution data. This is possible due to the independence of the lower resolution grid on the higher resolution grid in the buffer compression structure. For motion estimation, the interpolation process is modified to exploit the fact that high resolution pixels are linearly related to the low-resolution data. Thus, the motion estimation process may be performed at low resolution with modified interpolation filters. Similarly, for residual calculation, the system may exploit the fact that the low resolution data does not rely on the high resolution data in subsequent steps of the decoder. Thus, the system uses a reduced inverse transformation process that only computes the low resolution pixels from the full resolution transform coefficients. Finally, the system employs a de-blocking filter that de-blocks the low-resolution data independent from the high-resolution pixels (the high-resolution may be dependent on the low-resolution). This is again due to the linear relationship between the high-resolution and lower-resolution data.

An existing deblocking filter in the JCT-VC Test Model under Consideration JCTVC-A119 is desired in the context of 8×8 block sizes. For luma deblocking filtering, the process begins by determining if a block boundary should be de-blocked. This is accomplished by computing the following $$d=|p2_2-2*p1_2+p0_2|+|q2_2-2*q1_2+q0_2|+|p2_5-2*p1_5+p0_5|+|q2_5-2*q1_5+q0_5|,$$

where d is a threshold and $pi_j$ and $qi_j$ are pixel values. The location of the pixel values are depicted in FIG. 6. In FIG. 6, two 4×4 coding units are shown. However, the pixel values may be determined from any block size by considering the location of the pixels relative to the block boundary.

Next, the value computed for d is compared to a threshold. If the value d is less than the threshold, the de-blocking filter is engaged. If the value d is greater than or equal to the threshold, then no filtering is applied and the de-blocked pixels have the same values as the input pixel values. Note that the threshold may be a function of a quantization parameter, and it may be described as beta(QP). The de-blocking decision is made independently for horizontal and vertical boundaries.

If the d value for a boundary results in a decision to de-block, then the process continues to determine the type of filter to apply. The de-blocking operation uses either strong or weak filter types. The choice of filtering strength is based on the previously computed d, beta(QP) and also additional local differences. This is computed for each line (row or column) of the de-blocked boundary. For example, for the first row of the pixel locations shown in FIG. 6, the calculation is computed as $$\text{StrongFilterFlag}=((d<\text{beta(QP)})\&\&((|p3_i-p0_i|+|q0_i-q3_i|)<(\beta>>3)\&\&|p0_i-q0_i|<((5*t_C+1)>>1)).$$

where $t_C$ is a threshold that is typically a function of the quantization parameter, QP.

For the case of luminance samples, if the previously described process results in the decision to de-block a boundary and subsequently to de-block a line (row or column) with a weak filter, then the filtering process may be described as follows. Here, this is described by the filtering process for the boundary between block A and block B in FIG. 6. The process is:

$$\Delta=\text{Clip}(-t_C,t_C,(13*(q0_i-p0_i)+4*(q1_i-p1_i)-5*(q2_i-p2_i)+16)>>5))\ i=0,7$$

$$p0_i=\text{Clip}_{0-255}(p0_i+\Delta)\ i=0,7$$

$$q0_i=\text{Clip}_{0-255}(q0_i-\Delta)\ i=0,7$$

$$p1_i=\text{Clip}_{0-255}(p1_i+\Delta/2)\ i=0,7$$

$$q1_i=\text{Clip}_{0-255}(q1_i-\Delta/2)\ i=0,7$$

where $\Delta$ is an offset and $\text{Clip}_{0-255}(\ )$ is an operator the maps the input value to the range [0,255]. In alternative embodiments, the operator may map the input values to alternative ranges, such as [16,235], [0,1023] or other ranges.

For the case of luminance samples, if the previously described process results in the decision to de-block a boundary and subsequently to de-block a line (row or column) with a strong filter, then the filtering process may be described as follows. Here, this is described by the filtering process for the boundary between block A and block B in FIG. 6. The process is:

$$p0_i=\text{Clip}_{0-255}((p2_i+2*p1_i+2*p0_i+2*q0_i+q1_i+4)>>3);\ i=0,7$$

$$q0i=\text{Clip}_{0-255}((p1_i+2*p0_i+2*q0_i+2*q1_i+q2_i+4)>>3);\ i=0,7$$

$$p1i=\text{Clip}_{0-255}((p2_i+p1_i+p0_i+q0_i+2)>>2);\ i=0,7$$

$$q1i=\text{Clip}_{0-255}((p0_i+q0_i+q1_i+q2_i+2)>>2);\ i=0,7$$

$$p2_i=\text{Clip}_{0\text{-}255}((2*p3_i+3*p2_i+p1_i+p0_i+q0_i+4)>>3);$$
$$i=0,7$$

$$q2_i=\text{Clip}_{0\text{-}255}((p0_i+q0_i+q1_i+3*q2_i+2*q3_i+4)>>3);$$
$$i=0,7$$

where $\text{Clip}_{0\text{-}255}()$ is an operator the maps the input value to the range [0,255]. In alternative embodiments, the operator may map the input values to alternative ranges, such as [16, 235], [0,1023] or other ranges.

For the case of chrominance samples, if the previously described process results in the decision to de-block a boundary, then all lines (row or column) or the chroma component is processed with a weak filtering operation. Here, this is described by the filtering process for the boundary between block A and block B in FIG. 6, where the blocks are now assumed to contain chroma pixel values. The process is:

$$\Delta=\text{Clip}(-t_C,t_C,((((q0_i-p0_i)<<2)+p1_i-q1_i+4)>>3))$$
$$i=0,7$$

$$p0_i=\text{Clip}_{0\text{-}255}(p0_1+\Delta)\ i=0,7$$

$$q0_i=\text{Clip}_{0\text{-}255}(q0_i-\Delta)\ i=0,7$$

where $\Delta$ is an offset and $\text{Clip}_{0\text{-}255}()$ is an operator the maps the input value to the range [0,255]. In alternative embodiments, the operator may map the input values to alternative ranges, such as [16,235], [0,1023] or other ranges.

The pixel locations within an image frame may be partitioned into two or more sets. When a flag is signaled in the bit-stream, or communicated in any manner, the system enables the processing of the first set of pixel locations without the pixel values at the second set of pixel locations. An example of this partitioning is shown in FIG. 4. In FIG. 4, a block is divided into two sets of pixels. The first set corresponds to the shaded locations; the second set corresponds to the unshaded locations.

When this alternative mode is enabled, the system may modify the previous de-blocking operations as follows:

First in calculating if a boundary should be de-blocked, the system uses the previously described equations, or other suitable equations. However, for the pixel values corresponding to pixel locations that are not in the first set of pixels, the system may use pixel values that are derived from the first set of pixel locations. In one embodiment, the system derives the pixel values as a linear summation of neighboring pixel values located in the first set of pixels. In a second embodiment, the system uses bi-linear interpolation of the pixel values located in the first set of pixels. In a preferred embodiment, the system computes the linear average of the pixel value located in the first set of pixels that is above the current pixel location and the pixel value located in the first set of pixels that is below the current pixel location. Please note that the above description assumes that the system is operating on a vertical block boundary (and applying horizontal de-blocking). For the case that the system is operating on a horizontal block boundary (and applying vertical de-blocking), then the system computes the average of the pixel to the left and right of the current location. In an alternative embodiment, the system may restrict the average calculation to pixel values within the same block. For example, if the pixel value located above a current pixel is not in the same block but the pixel value located below the current pixel is in the same block, then the current pixel is set equal to the pixel value below the current pixel.

Second, in calculating if a boundary should use the strong or weak filter, the system may use the same approach as described above. Namely, the pixels values that do not correspond to the first set of pixels are derived from the first set of pixels. After computing the above decision, the system may use the decision for the processing of the first set of pixels. Decoders processing subsequent sets of pixels use the same decision to process the subsequent sets of pixels.

If the previously described process results in the decision to de-block a boundary and subsequently to de-block a line (row or column) with a weak filter, then the system may use the weak filtering process described above. However, when computing the value for $\Delta$, the system does not use the pixel values that correspond to the set of pixels subsequent to the first set. Instead, the system may derive the pixel values as discussed above. By way of example, the value for $\Delta$ is then applied to the actual pixel values in the first set and the delta value is applied to the actual pixel values in the second set.

If the previously described process results in the decision to de-block a boundary and subsequently to de-block a line (row or column) with a strong filter, then the system may do the following:

In one embodiment, the system may use the equations for the luma strong filter described above. However, for the pixel values not located in the first set of pixel locations, the system may derive the pixel values from the first set of pixel locations as described above. The system then store the results of the filter process for the first set of pixel locations. Subsequently, for decoders generating the subsequent pixel locations as output, the system uses the equations for the luma strong filter described above with the previously computed strong filtered results for the first pixel locations and the reconstructed (not filtered) results for the subsequent pixel locations. The system then applies the filter at the subsequent pixel locations only. The output are filtered first pixel locations corresponding to the first filter operation and filtered subsequent pixel locations corresponding to the additional filter passes.

To summarize, as previously described, the system takes the first pixel values and interpolates the missing pixel vales, computes the strong filter result for the first pixel values, updates the missing pixel values to be the actual reconstructed values, and computes the strong filter result for the missing pixel locations.

In a second embodiment, the system uses the equations for the strong luma filter described above. For the pixel values not located in the first set of pixel locations, the system derives the pixel values from the first set of pixel locations as described above. The system then computes the strong filter result for both the first and subsequent sets of pixel locations using the derived values. Finally, the system computes a weighted average of the reconstructed pixel values at the subsequent locations and the output of the strong filter at the subsequent locations. In one embodiment, the weight is transmitted from the encoder to the decoder. In an alternative embodiment, the weight is fixed.

If the previously described process results in the decision to de-block a boundary, then the system uses the weak filtering process for chroma as described above. However, when computing the value for $\Delta$, the system does not use the pixel values that correspond to the set of pixels subsequent to the first set. Instead, the system preferably derives the pixel values as in the previously described. By way of example, the value for $\Delta$ is then applied to the actual pixel values in the first set and the delta value is applied to the actual pixel values in the second set.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A video decoder that decodes video comprising:
   (a) an entropy decoder that decodes a bitstream defining said video;
   (b) an inverse transformation that transforms said decoded bitstream;
   (c) a predictor that selectively performs an intra-prediction and a motion compensated prediction on said decoded bitstream;
   (d) a buffer storing compressed image data retrievable from said buffer by said predictor when performing said motion compensated prediction wherein said compressed image data includes a low-resolution data set and selectively includes a high-resolution data set, where said low resolution data set is independent of said high resolution data set and used for decoding in a low resolution mode and wherein said low resolution data set and said high resolution data set together comprise a full resolution data set, and said low resolution data set and said high resolution data set are both used when decoding in a high resolution mode; and
   (e) a de-blocking filter that deblocks in high resolution mode over a boundary between a first image block associated with data in said low-resolution data set and a second image block, associated with data in said high resolution data set, for which said buffer has no residual data, because said encoder selectively did not include said high-resolution data set, and wherein said deblocking filter is capable of de-blocking in high resolution when said buffer selectively does not include said high resolution data set.

2. The decoder of claim 1 wherein said high resolution data set is based upon a linear prediction of said low resolution data set.

3. The decoder of claim 1 wherein said low resolution data set is encoded using a block truncation coding.

4. The decoder of claim 2 where said decoder uses an inverse transformation process that computes low resolution pixels from linearly-interpolated full-resolution transform coefficients.

5. The decoder of claim 1 where said de-blocking filter de-blocks low-resolution data independently of high-resolution data.

6. The decoder of claim 1 where said de-blocking filter de-blocks based on a threshold that is a function of a quantization parameter.

7. The decoder of claim 1 where said decoder selectively applies one of a weak de-blocking filter and a strong de-blocking filter to a luma channel.

8. The decoder of claim 7 where selection is based on at least one of: (a) a threshold that is a function of a quantization parameter; and (b) local differences in pixel values of adjacent blocks.

9. The decoder of claim 7 where said decoder selectively applies a weak de-blocking filter to a chroma channel when said decoder selectively applies a de-blocking filter to said luma channel, and selectively does not apply a filter to said chroma channel when said decoder selectively does not apply a filter to said luma channel.

* * * * *

UNITED STATES PATENT AND TRADEMARK OFFICE
CERTIFICATE OF CORRECTION

PATENT NO.         : 8,767,828 B2                              Page 1 of 1
APPLICATION NO.    : 12/838381
DATED              : July 1, 2014
INVENTOR(S)        : Ma et al.

It is certified that error appears in the above-identified patent and that said Letters Patent is hereby corrected as shown below:

On the title page item [57]

After
       "A system for encoding and decoding video that uses power reduction techniques."
insert
       --A buffer may store a low resolution data set and may selectively store a high resolution data set. A deblocking filter may be capable of deblocking in high resolution even where the buffer does not store a high resolution data set--.

Signed and Sealed this
Seventeenth Day of November, 2015

Michelle K. Lee
*Director of the United States Patent and Trademark Office*